(12) United States Patent
Gentile

(10) Patent No.: US 9,031,681 B2
(45) Date of Patent: May 12, 2015

(54) SYSTEM AND METHOD FOR CONTROLLING THE OPERATIONS OF A MANUFACTURING FACILITY

(71) Applicant: Siemens Aktiengesellschaft, München (DE)

(72) Inventor: Matteo Gentile, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 406 days.

(21) Appl. No.: 13/644,152

(22) Filed: Oct. 3, 2012

(65) Prior Publication Data

US 2013/0085587 A1  Apr. 4, 2013

(30) Foreign Application Priority Data

Oct. 3, 2011  (EP) .................................... 11183718

(51) Int. Cl.
| | |
|---|---|
| *G06F 19/00* | (2011.01) |
| *G06F 7/00* | (2006.01) |
| *G06Q 10/00* | (2012.01) |

(Continued)

(52) U.S. Cl.
CPC ................ *G06Q 10/06* (2013.01); *G06Q 50/04* (2013.01)

(58) Field of Classification Search
CPC ............ G06Q 10/06; G06Q 10/06312; G05B 19/4183; G05B 2219/31406; G05B 2219/32181
USPC ............... 700/95–97, 99, 100, 103, 117, 159, 700/169, 180, 182, 213, 214, 216; 705/7.11, 7.12, 7.22, 7.23, 7.26
See application file for complete search history.

(56) References Cited

U.S. PATENT DOCUMENTS

| | | | |
|---|---|---|---|
| 6,615,092 B2 * | 9/2003 | Bickley et al. .................. | 700/99 |
| 7,657,404 B2 | 2/2010 | Thurner | |
| 8,121,716 B2 | 2/2012 | Offenmüller | |

(Continued)

FOREIGN PATENT DOCUMENTS

| | | |
|---|---|---|
| WO | 0233603 A2 | 4/2002 |
| WO | 03071455 A2 | 8/2003 |

OTHER PUBLICATIONS

"MES Explained: A High Level Vision" MESA International White Paper, XX, XX, No. 6, Sep. 1, 1997, pp. 1-24, XP002260218.

(Continued)

*Primary Examiner* — Crystal J Barnes-Bullock
(74) *Attorney, Agent, or Firm* — Laurence A. Greenberg; Werner H. Stemer; Ralph E. Locher

(57) ABSTRACT

A system and a method for controlling the operations of a manufacturing facility with production resources that execute a production process and a manufacturing execution system with a production modeler and a production scheduler. A man-machine interface and/or graphical user interface enable the user to enter production orders and production scheduling data into the execution system. A production scheduler database stores production orders and production scheduling data. A data server process updates sensitive data that are required for real-time scheduling when a user modifies sensitive data. The data server process executes an event list queue with the data modification events launched by the database, periodically checks the event list queue for data modification events, reads from the database only the modified data of the sensitive data and/or sensitive class of data, and merges the modified data with the existing data. The updated data are then accessible to all users.

4 Claims, 2 Drawing Sheets

(51) Int. Cl.
*G06Q 10/06* (2012.01)
*G06Q 50/04* (2012.01)

(56) References Cited

U.S. PATENT DOCUMENTS

2002/0188499 A1* 12/2002 Jenkins et al. ............... 705/10

2005/0096774 A1* 5/2005 Bayoumi et al. ............. 700/109

OTHER PUBLICATIONS

Weygandt S: "Getting the MES model—methods for system analysis", ISA Transactions, Instrument Society of America, Pittsburgh, US, vol. 35, No. 2, Jan. 1, 1996, pp. 95-103, XP001020113.

\* cited by examiner

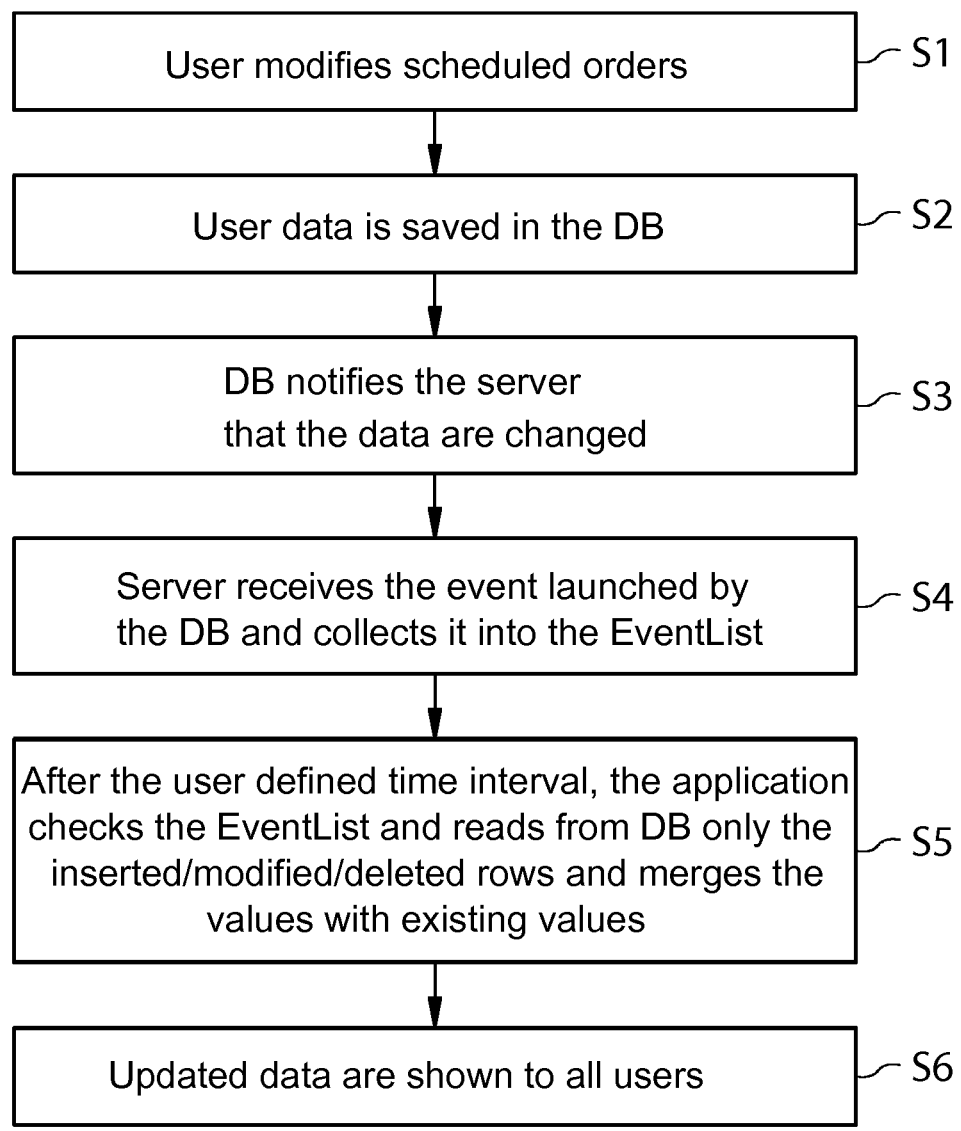

SYSTEM AND METHOD FOR CONTROLLING THE OPERATIONS OF A MANUFACTURING FACILITY

CROSS-REFERENCE TO RELATED APPLICATION

This application claims the priority, under 35 U.S.C. §119, of European patent application EP 11 183 718.3, filed Oct. 3, 2011; the prior application is herewith incorporated by reference in its entirety.

BACKGROUND OF THE INVENTION

Field of the Invention

The present invention relates to a system and a method for controlling the operations of a manufacturing facility.

The present invention belongs to the field of modern manufacturing processes. Those manufacturing processes are highly automated and may be divided into several hierarchical layers. For example, at the highest level, the enterprise resource planning (ERP) takes place, which may be referred to as a business layer. At lower levels, the hardware implementation and control take place, which may be referred to as various control levels. Industry standard ISA S95 defines an intermediate layer that integrates and connects together business and control layers. That intermediate layer is referred to as manufacturing execution system (MES) that defines an MES process in terms of data and interactions between functions, such as production modeling, production scheduling, resource management, resource allocation, dispatching, data collection and acquisition, quality assurance management, maintenance management, performance analysis, corrective scheduling, document control, labor management and material and production tracking.

In the area of manufacturing execution systems, an extensive line of products, such as, for instance, the SIMATIC® IT product from Siemens AG, Germany, is available for solving a variety of technical tasks. In this context, a broad range of IT solutions exist to connect the actual hardware close to the technical and/or logistical process to the application layer of the client driving the installation. Manufacturing execution systems have therefore been developed to meet all of the requirements of a service-oriented architecture (SOA) to integrate seamlessly into a totally integrated automation (TIA). For example, SIMATIC® IT is the manufacturing execution system in TIA, and SIMATIC® PCS 7 is a process control system suitable for cooperation with a manufacturing execution system.

Commonly assigned U.S. Pat. No. 7,657,404 B2 (published US 2005/0159932 A1) represents the various levels of a manufacturing process in form of a pyramid. In that representation, the uppermost level is the ERP level, and the lowermost level of the pyramid is the automation/control level, wherein the MES level is the linking level. Programmable logic controllers (PLCs) in conjunction with visualization and process control systems (PCSs) are typically used on the automation level. Individual drives, actuators and sensors used in the production and/or manufacturing facilities are in direct contact with the systems of the automation level.

U.S. Pat. No. 7,657,404 B2 (US 2005/0159932 A1) explains further that an MES system contains a runtime system (RTS) for providing time-based sequence control of the components involved (sub-components, modules, tasks, operating system processes etc.), and an engineering system (ES) for creating and editing programs which are intended for execution in the runtime system. A connection between the runtime system of the control facility (or of the automation system or the MES system) and a technical process is effected by way of inputs/outputs. The programming of the control facility and with it the specification of the behavior of the runtime system is carried out in the engineering system. The engineering system contains tools for configuring, planning and programming machines and controlling technical processes. The programs created in the engineering system are transferred to the runtime system RTS of a target system.

The control programs or installation specifications created by the engineering system are executed on a target system, for example, to control a technical process. The target system includes processors, storage facilities and a runtime system. The ES-created control programs are loaded onto the target system's runtime system. The underlying technical process, e.g., for an MES solution, is controlled via inputs and outputs. Actuators are influenced by the runtime system via the inputs and outputs. The technical process reacts by sending sensor data back to the runtime system via the inputs and outputs for further processing in the application.

Elements used for an installation description, or for a manufacturing or assembly solution (installation parts, installation components, machines, valves etc.) are linked in the engineering phase with meta information or physically contain meta information in the production model. Meta information may be information about the elements themselves (e.g., Who is using an element?, With which other elements does it interact?, With which other elements it cannot interact in parallel?). However, meta information can also comprise knowledge about an application, the business process to be implemented or the entire installation. This type of knowledge is present in the engineering phase (in functional specifications, design specifications or other installation documentation) and simply needs to be incorporated into the elements as meta information. In particular, the markup language XML (Extensible Markup Language) is suitable for describing meta information and linking it with elements.

Further, the client needs to implement its own software programs and application for which the SIMATIC® IT offers a Client Application Builder (CAB) tool that enables the user to customize the SIMATIC® IT software. All other MES software solutions probably will also comprise a user interface allowing the user the customization of the standard-related MES software. In this specific context in particular and in general, a vast kind of data interactions and data handling routine are managed by web applications being incorporated by the CAB tool into the MES software.

For the execution of the manufacturing process, it is therefore necessary to have a production plan to manage all the processes of the manufacturing facility (factory). The user requests on production orders are used to prepare a master production scheduler (MPS) using the MES production scheduler component. The MPS is the plan for production, staffing, inventory etc. and indicates when and how much of each product is required. The MPS quantifies significant processes, parts and other resources in order to optimize the production process, to identify bottlenecks and to anticipate the needs and the completed goods. Since the MPS drives much of the factory's activities, its accuracy and viability dramatically affects the profitability of the plant. After the MPS the production orders need to be assigned and executed to the various lines and units of equipment in the plant to realize the MPS. This phase, which is called detailed scheduling, is the phase to which the present invention is related. The purpose of the detailed scheduling in an industrial scenario is to minimize the production time and costs. It has also a component in environmental protection when natural resources, such as water and electric power, are managed to their best. The detailed scheduling tells the production facility what to produce, when, with which staff and on which equipment.

During detailed scheduling, the user (scheduler/planner) loads all the data required to prepare the schedule plan (e.g. displayed in form of a Gantt chart) in the production scheduler environment of the manufacturing execution system. When the user modifies the production order plan to optimize the scheduling, it may happen that another user modifies simultaneously its schedule. This runs the risk that the modification made by the second user invalidates the schedule planned by the first user. We shall explain by way of a few examples:

a) A first user prepares his schedule plan. A second user schedules production orders that produce material used by the production orders managed by the first user as input material. In case the second user modifies his schedule plan, the schedule plan of the first user might become infeasible, and the first user has to modify his schedule plan as soon as possible to avoid problems in the production.

b) A production order in production requires a halt due to a disturbance/failure of the respective production line; all users need to be notified as soon as possible and review this situation immediately in order to modify their schedule plan depending on the gravity of the disturbance.

c) New production orders have been created in the system due to new urgent customer requests; all users need to review these new production orders immediately to adapt/modify their schedule plan.

Presently, manufacturing execution systems (MES) manage this problem of notifying and updating the schedule plans by applications that use an automatic process which periodically retrieves all the relevant/sensitive data from the database of the MES and brings the data to the attention of the users, such as displaying the data at a MMI/GUI, SMS-messaging and the like. Unfortunately, this process has a rather low performance because in many cases the data did not change but is transmitted anyway thereby occupying band width in the communication backbone of the MES. On the other hand, if a distinct production order has been modified by one of the user, all other user need to be informed about this modification and not only about the recent changes. In other approaches, the update operation is done entirely manually by the control user with the substantial drawback of being prone to delay, faults and low capacity.

SUMMARY OF THE INVENTION

It is accordingly an object of the invention to provide a system and a method for controlling the operations of a manufacturing facility, which overcomes the above-mentioned disadvantages of the heretofore-known devices and methods of this general type and which offers a high level of flexibility in scheduling the production processes and simultaneously require only a limited amount of bandwidth to manage the transfer of the data that is relevant for real-time based scheduling.

With the foregoing and other objects in view there is provided, in accordance with the invention, a system for controlling the operations of a manufacturing facility, the system comprising:

a plurality of production resources configured to execute a production process according to a production schedule;

a manufacturing execution system comprised of, at engineering level, a production modeler configured to model the production resources and production dependencies and/or constraints thereof, and a production scheduler configured to schedule the production process according to production orders to be executed thereby using a data model of the production modeler;

at least one man machine interface and/or graphical user interface enabling a user to enter production orders and/or production scheduling data into the manufacturing execution system and to present all data records being relevant for the user when scheduling the production process in order to have the user's production order scheduled and executed accordingly;

a production scheduler database configured to store all production orders and/or production scheduling data and to provide predefined data stored in the database to the man machine interface and/or graphical user interface for the user in charge of scheduling; wherein the predefined data are determined sensitive data and/or sensitive class of data out of the data stored in the database, the sensitive data and/or sensitive class of data being required for a real-time scheduling;

a data server process configured to update the sensitive data and/or sensitive class of data for the users when a user modifies at least part of the sensitive data and/or sensitive class of data; wherein said data server process is enabled to execute an event list queue formed of the data modification events launched by the database, and said data server process is further configured to:

i) periodically check the event list queue for data modification events covering the sensitive data and/or sensitive class of data, ii) read from the database only the modified data of the sensitive data and/or the sensitive class of data, and iii) merge the modified data with the existing data wherein the updated data are accessible by all users.

With respect to the method, the object of the invention is achieved by a method for controlling the operations of a manufacturing facility, wherein the method comprises the following steps:

a) providing a number of production resources that execute a production process according to a production schedule;

b) providing a manufacturing execution system comprising at engineering level a production modeler to model the production resources and their production dependencies and/or constraints and a production scheduler to schedule the production process according to the production orders to be executed thereby using the data model of the production modeler;

c) providing at least one man machine interface and/or graphical user interface enabling the user to enter production orders and/or production scheduling data into the manufacturing execution system and to display all data being relevant for the user when scheduling the production process in order to get his production order scheduled and executed accordingly;

d) providing a production scheduler database that stores all production orders and/or production scheduling data and provides predefined data stored in the database to the man machine interface and/or graphical user interface for the user in charge of scheduling; wherein the predefined data is determined sensitive data and/or sensitive class of data out of the data stored in the database; said sensitive data and/or sensitive class of data being required for a real-time scheduling;

e) providing a data server process that updates the sensitive data and/or sensitive class of data for the users when a user modified at least part of the sensitive data and/or sensitive class of data; wherein the data server process is enabled to execute an event list queue; said event list queue comprising the data modification events launched by the database. The data server process is further enabled to:

i) periodically check the event list queue for data modification events covering the sensitive data and/or sensitive class of data, ii) read from the database only the modified data of the sensitive data and/or the sensitive class of data, and iii) merge the modified data with the existing data wherein the updated data is accessible by all users.

The system and method therefore have the main advantage that all users can view always updated data and the respective application reads the updates only when it is strictly necessary, thereby additionally limited those updates to the portion that have been changed since the last and that belong to the predefined sensitive data. This measure tremendeously minimizes the data exchange in the production modeler and production scheduler thereby reducing the bandwidth consumed and increasing the performance of the overall manufacturing execution system when controlling the production accordingly. Therefore, also the robustness of the planning and scheduling module increases because all users in charge with scheduling are always confronted with updated (most recent) real-time data.

In order to satisfy the demand on the real-time update, the system and the method advantageously provide a data entry which enables a master user to define the period for checking the event list queue. Typical time periods for checking are under the consideration of the delay time in a factory in range of a few seconds up to maximum a few minutes.

Sensitive data and/or sensitive class of data are in the context of the present invention for example all data related to the usage of a resource, to the amount of material on stock, to the amount of material to be delivered or produced, to the time intervals where resources are maintained or for other reasons not productive and the like.

The method and the system can be in a preferred example of the present invention implemented in the form of a SQL Server Notification Service that allows to an user application to be notified when observed data has been modified on the database. Notification Services provide an easy-to-use programming model for generating and formatting notifications based on personal subscriptions that are reflected in the Event List Queue accordingly. Using the Microsoft ADO API, it is for example possible to define an event to infer when the observed sensitive data and/or sensitive class of data have been changed on the database.

Other features which are considered as characteristic for the invention are set forth in the appended claims.

Although the invention is illustrated and described herein as embodied in a system and a method for controlling the operations of a manufacturing facility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
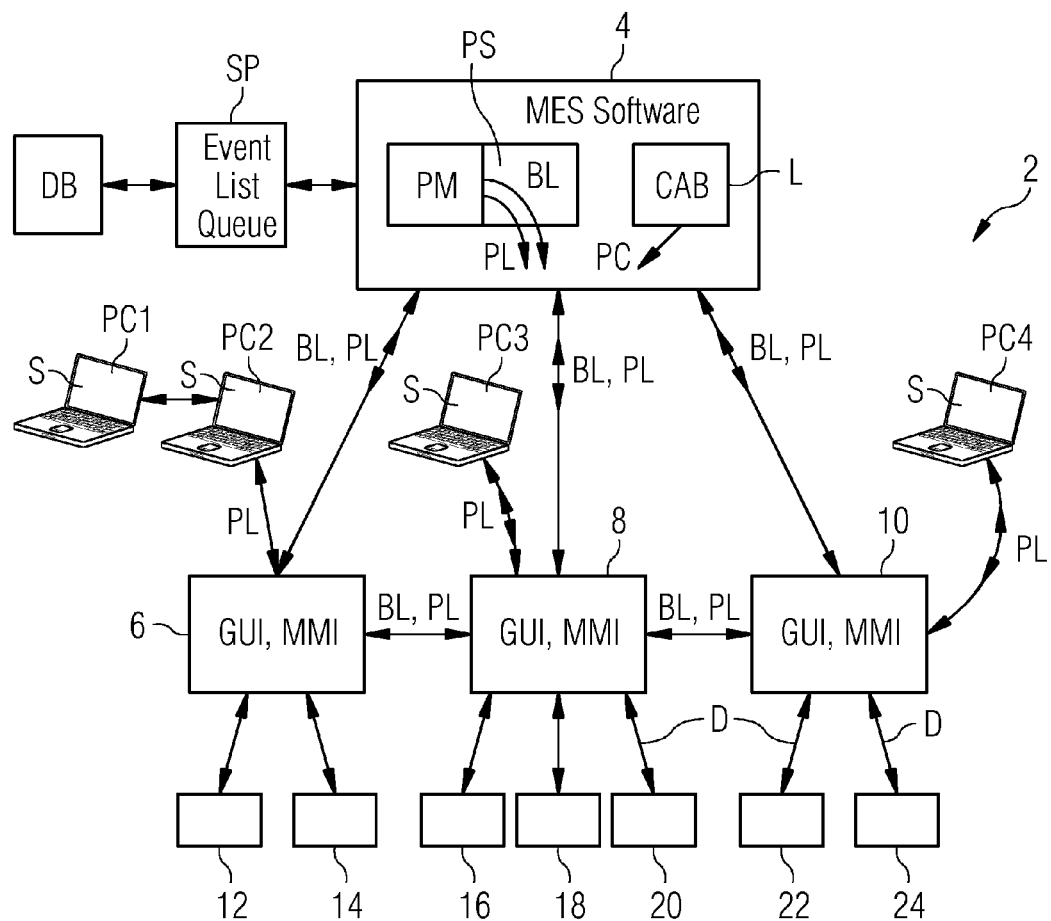
FIG. 1 a schematic illustration of one embodiment of a manufacturing execution system in the environment of a production plant, and FIG. 2 a representation of the substantial workflow of a method for controlling the operation in a production plant.

Referring now to the figures of the drawing in detail and first, particularly, to FIG. 1 thereof, there is illustrated a schematic overview of a plant control system 2 working as a manufacturing execution system (MES). The system/network 2 comprises a number of data processing units 4, 6, 8, 10 running an MES software for controlling and/or monitoring a production process operating a number of production components 12 to 24. The production components 12 to 24 can be sensors, actuators, motors, step drives, conveyors, valves, pumps, complete units, and the like. The data processing units 4 to 10 are network computers which typically comprise logical units, calculation means, storage means, display means (man-machine interface MMI and/or graphical user interface GUI) and the like. The data processing units 4 to 10 are connected within a plant network in order to exchange data to the required extent. Usually, this connection is achieved by a W-LAN or cable-bound or mixed Ethernet connections. One of the data processing units, hereinafter referred to as a master console 4, is executing the MES software for controlling and monitoring the operation of the plant.

The master console 4 comprises within the MES software a production modeler PM and a production scheduler PS. This production modeler PM is enabled to define a business logic BL within a fully graphical environment as facilitated by the MES software. The business logic BL, when finally generated by the production modeler, comprises a plant model of the production process and the related operating procedures for the production components 12 to 24 in a fully graphical environment. Even for the creation of the business logic BL high-level graphical language is used within the MES software, preferably consistently with the ISA-95 standard.

The master console 4 further comprises the production scheduler PS which enables the user to define a workflow of production processes on the resources 12 to 24 and their dependencies and/or constrains as the resources have been modeled in the production modeler PM. The production scheduler PS usually also displays the course of production operations on the display of one or more of the data processing units 4 to 10. The data displayed is usually prepared to fit into a real-time Gantt chart which shows the substantial operations and the usage of the resources 12 to 24 in the past, at present and also in the future.

The master console 4 further comprises a client application builder CAB within the MES software being enabled to provide a native, WEB based graphical user interface for various purposes. One purpose is of generating cross-functionality graphic screens S, said screens forming part of the network 2 as presentation clients PC, PC1 to PC4 and displaying data D which is stemming from the production components 12 to 24 and which is manipulated from the business logic BL by the production modeler PM, where it is required, i.e. when the data stemming from one of the production components 12 to 24 has to further processed or averaged with data stemming from other production components. In general, the client application builder CAB within the Simatic IT® software suite provides a CAB Engineering module that offers a Visual Studio .NET environment where the CAB applications are developed by the user. Further, the client application builder CAB comprises a CAB Web Server where CAB applications (those developed with the CAB Engineering environment) are executed upon request of a user. Furthermore, the CAB server comprised in the client application builder takes care for exchanging data with the various SIMATIC IT® data sources and with the client side. And last but not least the client application builder CAB comprises a CAB client which requires, by means of a Web browser, typically a resource (for example, the display of a set of data) to the CAB Web Server. On the CAB Web Server, two web applications are installed, on the one hand the SIMATIC IT® portal and the SIMATIC IT® console. These two applications allow the use and visualization of the components also involved in the SIMATIC IT® software suite, such as the production modeler, production scheduler, production tracer and so on.

Using the man machine interface and/or graphical user interface of the data processing means 4 to 10 the user is enabled to enter production orders and/or production scheduling data into the manufacturing execution system MES and to receive usually in a displayed form all data being relevant for the user when scheduling the production process in order to get his production order scheduled and executed accordingly. A production scheduler database DB stores all production orders and/or production scheduling data and provides predefined data stored in the database to the man machine interface and/or graphical user interface for the user in charge of scheduling. Thereby, the user is further enabled to customize insofar the predefined data as to determine sensitive data and/or sensitive class of data out of the data stored in the database DB.

Sensitive data and/or sensitive class of data are in the context of the present invention for example is all data related to the usage of a resource, to the amount of material in stock, to the amount of material to be delivered or produced, to the time intervals where resources are maintained or for other reasons not productive and the like. Sensitive data and/or sensitive class of data are essential for a real-time scheduling in order to be notified of the schedule decisions other user have entered into the production scheduler.

The master console 4 is further linked to a data server process SP that updates the sensitive data and/or sensitive class of data for the users when a user modified at least part of the sensitive data and/or sensitive class of data. The data server process SP is enabled to execute an event list queue ELQ; said event list queue ELQ comprising the data modification events launched by the database DB. The data server process SP is operated in order to:

i) periodically check the event list queue EQL for data modification events covering the sensitive data and/or sensitive class of data, ii) read from the database DB only the modified data of the sensitive data and/or the sensitive class of data, and iii) merge the modified data with the existing data wherein the updated data is accessible by all users of the production scheduler PS.

FIG. 2 illustrates the major steps in the workflow according to the present invention when controlling the production operations of the production plant 2. When a user start the production scheduler (application) SP on his personal computer PC1 to PC4 or on one of the data processing means 4 to 10, the application loads all useful data from the database DB (at least the sensitive data and/or all sensitive classes of data) wherein for the sensitive data and/or the sensitive classes of data an SQL Dependency (SqlDependency) is activated to receive the relevant data change events originated by the server process SP, i.e. a SQL Server Process.

To avoid that for every change of a single data entry all data displayed to the user in charge of scheduling is always refreshed, all the updates of data notified from the database to the event list queue ELQ of the server process SP, wherein the data needs to be comprised among the sensitive data and/or sensitive class of data, are collected and added in the dedicated event list queue ELQ. Periodically at a time interval specified, the event list queue ELQ is checked, and if there are updates on the sensitive part of data found, the data initially read is updated with the values stored in the database and being present in the observed (sensitive) table with the recently modified data stemming from the last update to the current update. To avoid any mismatch in the time ranking the data has been amended, a time stamp column is provided in the tables of the sensitive data and/or sensitive class of data. The production scheduler application is in charge of updating this time stamp column value every time the record changes by updating the time stamp, too. The time stamp itself usually has to be stored with a precision of milliseconds.

This way safeguards that the data displayed to the user in charge of scheduling is always correct and reflect the scheduling process in real-time. Any update operations are securely limited to those events where changes in the sensitive data and/or the sensitive class of data are found in the event list queue ELQ. Even in case that many data entries have been changed in short term, the update can be executed by just one read operation from the database DB. The flowchart shown in FIG. 2 illustrates the primarily important steps of the present procedure according to the present invention.

In step S1, an arbitrary user modifies its scheduled production orders. In step S2, this user entry is stored in the production scheduler database DB. In step S3, the production scheduler database DB notifies the data server process SP that data has been changed by a user. In step S4, the data server process SP receives a notification of the data change event launched by the production scheduler database DB. These notifications are stored into the event list queue ELQ. In step S5, the production scheduler application periodically checks the event list queue ELQ and reads from the database DB only the inserted/modified/deleted rows of data that are assigned to the sensitive data and/or sensitive class of data. The data read is subsequently merged with the existing and unamended data in order to generate a complete data record, ready to be conveyed to the user in charge of the scheduling. In step S6, the updated data record is shown to all associated users and the production process is currently continued to the scheduled operation according to the latest confirmed production schedule. Due the possible amendments of the data, every user is in real-time mode enabled to reflect the consequences of the recent amendments on his individual scheduled production operations.

The system and method explained above therefore have the main advantage that all users can view always updated data and the respective production scheduler application reads the updates only when it is strictly necessary, thereby additionally limited those updates to the portion that have been changed since the last and that belong to the predefined sensitive data. This measure tremendously minimizes the data exchange in the production modeler and production scheduler thereby reducing the bandwidth consumed and increasing the performance of the overall manufacturing execution system when controlling the production accordingly. Therefore, also the robustness of the planning and scheduling module increases because all user in charge with scheduling are always confronted with updated (most recent) real-time data.

A solution of the present invention has been based on the SIMATIC® IT Production Suite database where only the production order and production order entries database are considered. The production scheduler application loads this data and displays this data to the users in two tables. The advantage of the present invention becomes apparent from a simple example. A scenario is considered where a user loads from the production scheduler database 16.000 production orders. The production scheduler application reads all the production orders from the production scheduler database DB in about 300 ms wherein this time span only reflects the time for loading the data from the data base DB). Another user now modifies about 200 existing production orders (out of the amount of presently 16,000 pending production orders. The production scheduler application loads after checking the event list queue on the 200 modified production orders that requires about 30 ms which is ten times less than the time required for loading the complete data set of all existing production orders. This simple example easily demonstrates the increase of performance that is achieved by the present invention.

The invention claimed is:

1. A system for controlling the operations of a manufacturing facility, the system comprising:
 a) a plurality of production resources configured to execute a production process according to a production schedule;
 b) a manufacturing execution system comprised of, at engineering level, a production modeler configured to model the production resources and production dependencies and/or constraints thereof, and a production scheduler configured to schedule the production process according to production orders to be executed thereby using a data model of the production modeler;
 c) at least one man machine interface and/or graphical user interface enabling a user to enter production orders and/or production scheduling data into the manufacturing execution system and to present all data records being relevant for the user when scheduling the production process in order to have the user's production order scheduled and executed accordingly;
 d) a production scheduler database configured to store all production orders and/or production scheduling data and to provide predefined data stored in the database to the man machine interface and/or graphical user interface for the user in charge of scheduling; wherein the predefined data are determined sensitive data and/or sensitive class of data out of the data stored in the database, the sensitive data and/or sensitive class of data being required for a real-time scheduling;
 e) a data server process configured to update the sensitive data and/or sensitive class of data for the users when a user modifies at least part of the sensitive data and/or sensitive class of data; wherein said data server process is enabled to execute an event list queue formed of the data modification events launched by the database, and said data server process is further configured to:
 i) periodically check the event list queue for data modification events covering the sensitive data and/or sensitive class of data,
 ii) read from the database only the modified data of the sensitive data and/or the sensitive class of data, and
 iii) merge the modified data with the existing data wherein the updated data are accessible by all users.

2. The system according to claim 1, wherein a period for checking the event list queue is user-definable.

3. A method for controlling the operations of a manufacturing facility, the method which comprises:
 a) providing a plurality of production resources that execute a production process according to a production schedule;
 b) providing a manufacturing execution system comprised of, at engineering level, a production modeler for modeling the production resources and their production dependencies and/or constraints and a production scheduler for scheduling the production process according to production orders to be executed thereby using the data model of the production modeler;
 c) providing at least one man machine interface and/or graphical user interface enabling a user to enter production orders and/or production scheduling data into the manufacturing execution system and to display data that are relevant for the user when scheduling the production process in order to have the user's production order scheduled and executed accordingly;
 d) providing a production scheduler database for storing therein all production orders and/or production scheduling data and for providing predefined data stored in the database to the man machine interface and/or graphical user interface for the user in charge of scheduling; wherein the predefined data are determined sensitive data and/or sensitive class of data out of the data stored in the database, and wherein the sensitive data and/or sensitive class of data are required for a real-time scheduling;
 e) providing a data server process that updates the sensitive data and/or sensitive class of data for the users when a user modifies at least part of the sensitive data and/or sensitive class of data, the data server process being enabled to execute an event list queue containing the data modification events launched by the database, and the data server process being further enabled to:
 i) periodically check the event list queue for data modification events covering the sensitive data and/or sensitive class of data;
 ii) read from the database only the modified data of the sensitive data and/or the sensitive class of data; and
 iii) merge the modified data with the existing data to generate updated data accessible by all users.

4. The method according to claim 3, wherein the period for checking the event list queue is user-defined.

* * * * *